US010304444B2

(12) United States Patent
Mathias et al.

(10) Patent No.: US 10,304,444 B2
(45) Date of Patent: May 28, 2019

(54) FINE-GRAINED NATURAL LANGUAGE UNDERSTANDING

(71) Applicant: AMAZON TECHNOLOGIES, INC., Seattle, WA (US)

(72) Inventors: Lambert Mathias, Arlington, VA (US); Thomas Kollar, San Jose, CA (US); Arindam Mandal, Redwood City, CA (US); Angeliki Metallinou, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/196,540

(22) Filed: Jun. 29, 2016

(65) Prior Publication Data
US 2017/0278514 A1 Sep. 28, 2017

Related U.S. Application Data

(60) Provisional application No. 62/312,121, filed on Mar. 23, 2016.

(51) Int. Cl.
*G06F 17/20* (2006.01)
*G10L 15/22* (2006.01)
(Continued)

(52) U.S. Cl.
CPC .............. *G10L 15/22* (2013.01); *G06F 16/332* (2019.01); *G06F 16/3329* (2019.01);
(Continued)

(58) Field of Classification Search
CPC ........ G06F 17/20; G06F 17/21; G06F 17/218; G06F 17/2229; G06F 17/2241;
(Continued)

(56) References Cited

U.S. PATENT DOCUMENTS 6,311,150 B1 * 10/2001 Ramaswamy ...... G06F 17/2765
704/1
8,346,795 B2 * 1/2013 Roulland .......... G06F 17/30598
707/706

(Continued)

OTHER PUBLICATIONS

International Search Report and Written Opinion of the International Searching Authority; PCT/US2017/018655; dated May 26, 2017.

(Continued)

*Primary Examiner* — Qi Han
(74) *Attorney, Agent, or Firm* — Pierce Atwood LLP

(57) ABSTRACT

A system capable of performing natural language understanding (NLU) without the concept of a domain that influences NLU results. The present system uses a hierarchical organizations of intents/commands and entity types, and trained models associated with those hierarchies, so that commands and entity types may be determined for incoming text queries without necessarily determining a domain for the incoming text. The system thus operates in a domain agnostic manner, in a departure from multi-domain architecture NLU processing where a system determines NLU results for multiple domains simultaneously and then ranks them to determine which to select as the result.

20 Claims, 12 Drawing Sheets

(51) Int. Cl.
  *G10L 15/26* (2006.01)
  *G10L 15/02* (2006.01)
  *G10L 15/18* (2013.01)
  *G10L 15/14* (2006.01)
  *G06F 16/35* (2019.01)
  *G06F 16/332* (2019.01)
  *G06F 17/27* (2006.01)

(52) U.S. Cl.
  CPC ............ *G06F 16/35* (2019.01); *G06F 17/277* (2013.01); *G06F 17/279* (2013.01); *G10L 15/02* (2013.01); *G10L 15/142* (2013.01); *G10L 15/1815* (2013.01); *G10L 15/26* (2013.01); *G10L 2015/223* (2013.01)

(58) Field of Classification Search
  CPC ............ G06F 17/2247; G06F 17/2276; G06F 17/2282; G06F 17/27; G06F 17/2705; G06F 17/2715; G06F 17/272; G06F 17/274; G06F 17/2765; G06F 17/277; G06F 17/2775; G06F 17/278; G06F 17/2818; G10L 15/00; G10L 15/01; G10L 15/04; G10L 15/06; G10L 15/063; G10L 15/08; G10L 15/18; G10L 15/183; G10L 15/20; G10L 15/22; G10L 15/24; G10L 15/2628

USPC ....... 704/235, 231, 240, 245, 250, 257, 1, 9, 704/275

See application file for complete search history.

(56) References Cited

U.S. PATENT DOCUMENTS

| | | |
|---|---|---|
| 2008/0052262 A1 | 2/2008 | Kosinov et al. |
| 2011/0087626 A1* | 4/2011 | Yeleshwarapu ...... G06Q 10/087 706/12 |
| 2014/0163959 A1* | 6/2014 | Hebert ................ G06F 17/2785 704/9 |
| 2015/0081281 A1 | 3/2015 | Bustelo et al. |
| 2015/0228275 A1 | 8/2015 | Watanabe et al. |
| 2016/0034600 A1* | 2/2016 | Joshi ................ G06F 17/30654 707/769 |

OTHER PUBLICATIONS

International Preliminary Report on Patentability from the International Bureau for PCT/US2017/018655, dated Oct. 4, 2018.

* cited by examiner play [latest] [album] by [foo fighters]

play [latest$_{ENUM}$] [album$_{ENUM}$] by [foo fighters$_{PER}$]

FINE-GRAINED NATURAL LANGUAGE UNDERSTANDING

CROSS-REFERENCE TO RELATED APPLICATION DATA

This application claims priority to U.S. Provisional Patent Application Ser. No. 62/312,121, entitled "Fine-Grained Natural Language Understanding," filed on Mar. 23, 2016, in the names of Thomas Kollar et al. The above provisional application is herein incorporated by reference in its entirety.

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
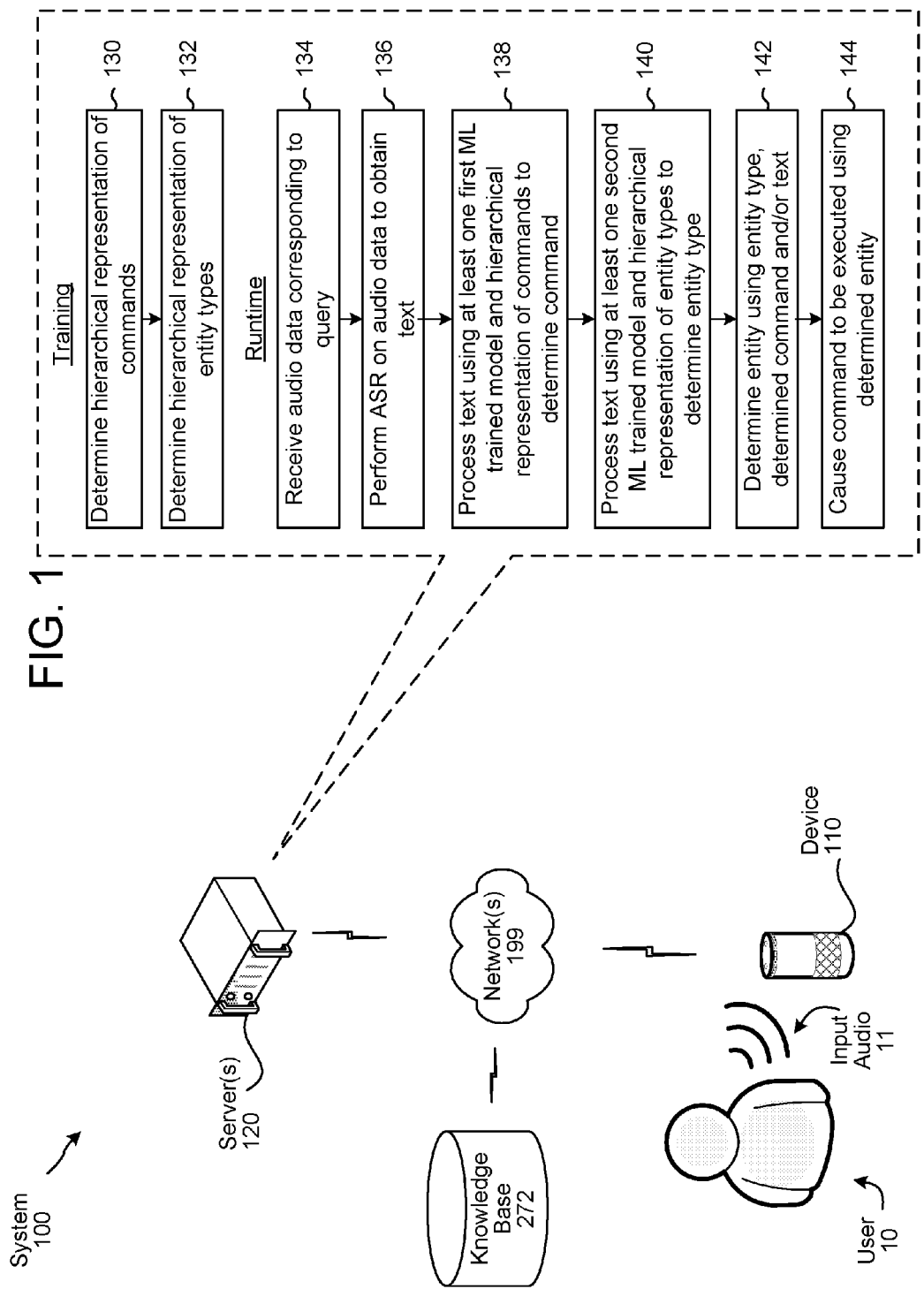
FIG. 1 illustrates a system for configuring and operating a system to parse incoming queries according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local device having one or more microphones being configured to capture audio from a user speaking. The audio is comprised of the sound wave produced by the user when speaking the utterance. The local device may detect the audio using the microphones and may convert the audio into audio data, which is computing data representing the audio. The audio data may then be sent to a downstream remote device for further processing, such as determining that the audio data corresponds to command that the user desires to execute. The command may then be performed by a combination of remote and local devices using computer-executable instructions corresponding to the command.

In certain situations, a user utterance may include a query. The query may include an input to the system to execute a command (such as playing music) or to provide information in response to the query. That is, the user may ask the system to provide some information in response to the utterance. As part of NLU processing, in order to respond to a user's query, the system may rely on a knowledge base to obtain or confirm information requested by the query. A knowledge base is a data store that includes facts organized in a particular manner that may be used to respond to user queries.

There are many types of queries that a user may pose from simple single-fact questions (for example, "what is the capital of France?") to more detailed questions involving time, place, multiple entities, etc. (for example, "when was Tom Cruise married to Nicole Kidman?"). Further, the query may include a command that may range in specificity/complexity, for example one command may be "set a timer for 5 minutes" where another may be "play the latest album by the foo fighters." Different utterances may involve different intents, where an intent corresponds to a user desire to for the system to perform some command. Each particular command may then be associated with one or more computer executable instructions that device(s) of the system can execute to perform the command. The command may result in the system (or some downstream component or device in communication with the system) taking some action, creating (and potentially sending) some output data or other different operations that fulfill the user's request. In the examples above the utterances correspond to commands of determining a capital of a country, determining a date when two individuals were married, setting a timer, and playing music. Different commands may also involve different entities. An entity is a person, place, thing, etc. that has an identity. In order to perform the action desired by the utterance the system must be able to identify the entity (or entities) in the utterance. In the examples above the entities involved are France, Tom Cruise, Nicole Kidman, Foo Fighters, and their latest album.

The process of identifying the intent of an utterance may be referred to as intent/command classification. The process of identifying an entity in an utterance may involve a two stage processes where the first stage is entity recognition and the second stage is entity resolution, actually matches the text of the entity to a specific entity known to the system. The first stage, entity recognition, involves identifying a mention of an entity in query text. This includes identifying particular text portion within the query text that corresponds to the entity. This particular text portion is sometimes called a "slot." As can be appreciated, different entities may share a name even if they are different entities and are understood by the system to be unique and distinct from each other. For example, "Madonna" may refer to either the musical artist, the religious figure, or even to a specific work of art. The second stage of identifying an entity, called entity resolution, actually determines the precise entity that corresponds to the particular text of the slot. As can be appreciated, natural language understanding involves a complex analysis of text (which may be obtained either from a spoken utterance or from some other source) and potentially other data to determine the text's precise meaning.

Present NLU query answering systems typically employ a multi-domain architecture where each domain represent a certain subject area for a system. Example domains include weather, music, shopping, etc. Each domain is typically configured with its own intents/commands, slot structure, entities, knowledge base, or the like. Thus, in order to configure a system to handle a new function, intents, slots and other items used for speech processing need to be specially designed, configured, and tested for each new function. This leads to significant resource expenditures, even for domains that may be similar or have overlapping subject matter. For example, a domain for playing music may be similar to a domain for playing a movie, and may involve many of the same entities (such as musicians who are also actors). Similarly, a shopping domain may overlap a number of different domains (for example music, where an album may be the subject of a play music intent as well as a purchase album intent). Present NLU systems may need to be trained separately to recognize a play music intent for a specific album as well as being trained separately to recognize a purchase album intent for the same album.

Further, during runtime, existing speech processing systems may process a single utterance using multiple domains at the same time. As the system may not know what domain the utterance belongs in until the speech processing is complete, the system may process text of an utterance substantially simultaneously using models for books, video, music, etc. The results of that processing may be ranked, with the highest ranking results being executed/returned to the user. Such parallel domain processing can waste significant computing resources at runtime, in addition to the resources expended configuring the system to operate across multiple domains.

Offered is a natural language processing system that effectively removes the concept of domain and performs intent/command classification and entity resolution using a hierarchical structure of intents/commands and entities. For example, all the commands capable of being executed by the system are organized into a command hierarchy that is stored and used by the system, where each intent may be represented not only by its specific command (for example, listen to music may be "ListenMusic") but also by its position in the hierarchy (for example, /ConsumeAct/ListenAct/ListenAct.Music). In determining a command to be executed in response to input text during runtime, the system may take the input text and traverse the hierarchy of commands using machine learning model(s) to arrive at the highest scoring command. That command, regardless of domain, may be selected by the system. Similarly, entity types capable of being recognized by the system are organized into an entity type hierarchy that is stored and used by the system. In determining which entity/entities are mentioned in text at runtime, the system may take the input text and traverse the hierarchy of entity types using machine learning model(s) to arrive at the highest scoring entity type. The system may then use that entity type to refer to a list of entities in the knowledge base for ultimate entity resolution. The system may thus avoid the parallel multi-domain approach that is currently used for NLU processing.

FIG. 1 shows a system 100 configured to perform NLU processing. Although FIG. 1, and lower figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, during a training process the system determines (130) a hierarchical representation of intents/commands, which are represented by commands that are executable by the computing system. The system may also determine (132) a hierarchical representation of entity types that are recognizable by the computing system. Information about the entity types, entities themselves and/or commands intents may be stored in the knowledge base 272. Information from the knowledge base 272, and/or other sources, may be used to determine the hierarchical representation of commands and hierarchical representation of entity types.

At runtime the system may receive (134) audio data corresponding to a user query. The system may then perform (136) ASR on the audio data to obtain text. The system may then process (138) the text using at least one first machine learning (ML) trained model and the hierarchical representation of commands to determine a command associated with the text. The at least one first ML model may include model(s) associated with individual commands or categories of commands as explained below in reference to FIG. 8. The system may also process (140) the text using at least one second machine learning (ML) trained model and the hierarchical representation of entity types to determine an entity type associated with the text. The at least one first ML model may include model(s) associated with individual entity types or categories of entity types. The system may then determine (142) the precise entity referred to using the determined entity type, determined command, and/or input text. The system may then cause (144) a command to be executed using the determined command and entity, for example by sending information regarding the command and entity to a command processor (290, discussed below in reference to FIG. 2) along with an instruction to execute a command using the command and entity.

Figure 2:
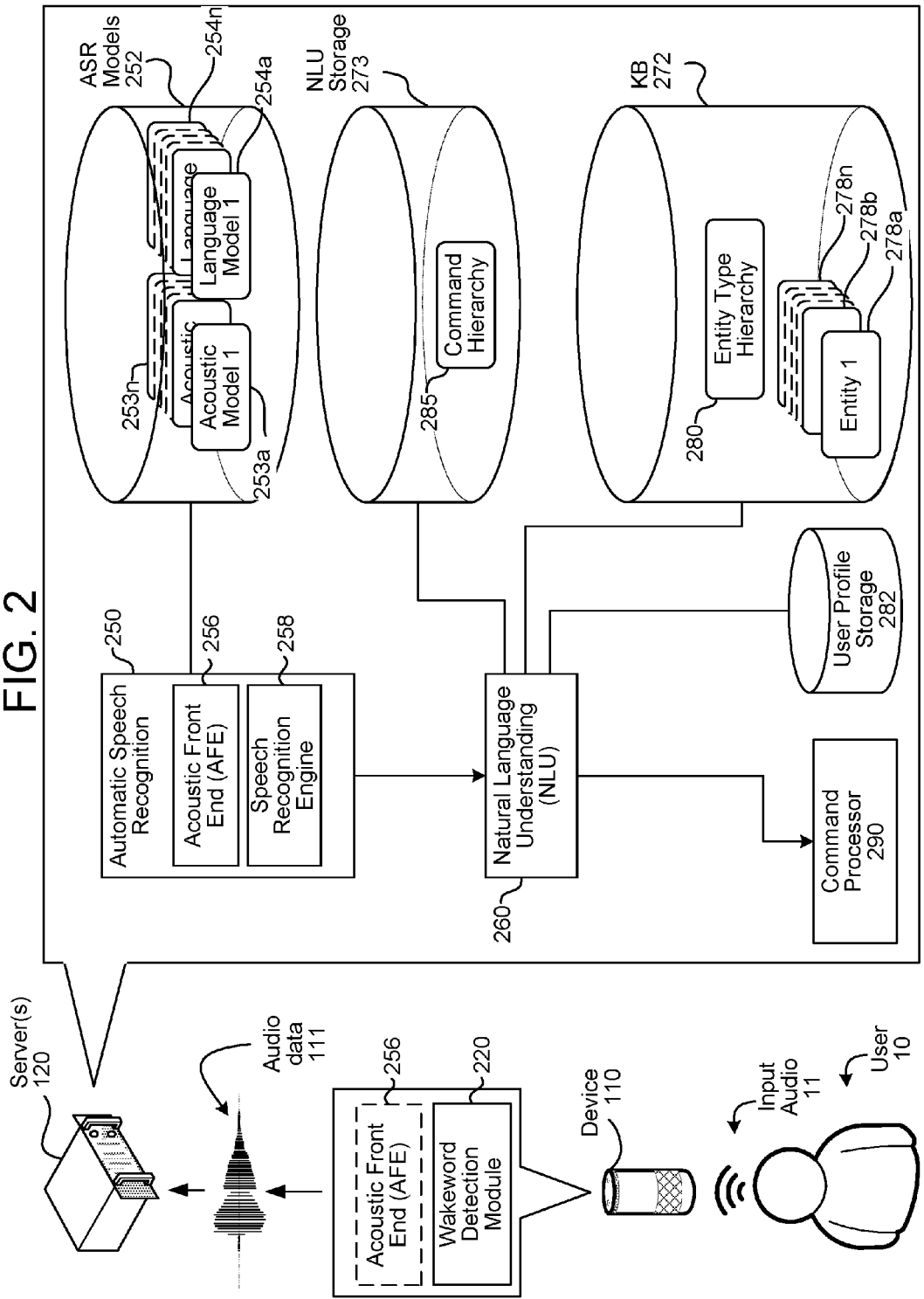
FIG. 2 is a conceptual diagram of components of a speech processing system according to embodiments of the present disclosure.

Further details of the domain-agnostic NLU processing are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio data, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. As discussed below, the NLU component may perform entity resolution and intent/command classification using hierarchical representations of the entity types and commands. In performing NLU processing, the NLU component may also utilize gazetteer information which may assist the NLU component in obtaining user-specific NLU results. For example, the gazetteer information (accessible through user profile storage 282) may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways. In addition, the NLU processing may use data about specific commands available using a specific device, either indexed by Device ID, User ID, or Household ID, or some other indicator.

Generally, the NLU process takes textual input (such as processed from ASR 250 based on the utterance input audio 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom" (which may involve a downstream command processor 290 linked with a telephone application).

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parse and tag text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 272.

Traditionally, NLU processes have been configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

One difficulty with the domain-based approach, however, is that for general purposes NLU systems (i.e., NLU systems that are capable of receiving commands for multiple different domains) is that determining a domain for a particular query may involve additional computing resources and may potentially increase latency from when a query is received and when a query is processed. For example, a system that is capable of executing many commands across different domains (e.g., "shopping", "music", "calendaring", etc.) does not necessarily know, when receiving a particular query, which domain is the correct one to handle a specific incoming request.

To address this, some traditional NLU systems have employed a parallel, multi-domain architecture. In the multi-domain architecture, each domain (which may include a set of commands and entity slots that define a larger concept such as music, books etc.) is constructed separately and made available to an NLU component 260 during runtime operations where NLU operations are performed on text (such as text output from an ASR component 250). Each domain may have specially configured components to perform various steps of the NLU operations. For example, each domain may be associated with a particular language model and/or grammar database, a particular set of intents/ commands, and a particular personalized lexicon. Also, domain-specific gazetteers may include domain-indexed lexical information associated with a particular user and/or device. A user's music-domain lexical information might include album titles, artist names, and song names, for example, whereas a user's contact-list lexical information might include the names of contacts.

Further, each domain may have a specially configured pipeline, including specially configured components to perform various steps of the NLU operations. For example, a music domain may have a named entity recognition (NER) component that identifies what slots (i.e., portions of input text) may correspond to particular entities relevant to the music domain. Whereas a shopping domain may have a different NER component that identifies what slots may correspond to particular entities relevant to the shopping domain. The NER component for the music domain may be trained differently, and may operate differently, from the NER component for the shopping domain. Similarly, each domain may also have its own intent/command classification (IC) component that determines the intent of the text (assuming that the text is within the proscribed domain). Thus, the IC component for a music domain may determine a music-based intent for the incoming text assuming the text is associated with music while an IC component for a shopping domain may determine a shopping-based intent for the incoming text assuming the text is associated with shopping. Further, each domain may have its own entity resolution component, which tries to match an entity with any slots identified by the particular NER component (potentially while referencing some domain-specific authority source such as a domain specific knowledge base).

Thus, such systems may have had a specific NLU pipeline (NER component, IC component, entity resolution component, knowledge base, etc.) for each domain of the system. When incoming query text was received it would be processed, substantially in parallel, but each NLU pipeline resulting in many different domain-specific NLU results for the same input query text. A cross-domain ranking component could then be used to rank the different NLU results for the different domains, and select what the system believed to be the most applicable results given the input text and other factors. This approach, however, may lead to unnecessary use of computing resources, as any domain-specific NLU results not ultimately selected would be discarded.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions. Further, domain agnostic queries that cross domains may be difficult to holistically respond to given the divisions between domains. For example, the query "get the hunger games" may refer to a request to purchase (or read aloud) a book, purchase (or play) a movie, or purchase (or play) a soundtrack, but the multi-domain architecture and approach may result in only one such action being performed with any acknowledgement of ambiguity as the "hunger games" can refer to a book, movie, or soundtrack (or possibly all three).

As an example, the text "get the hunger games" might produce different NLU results, with different intent tags and different entity tags depending on the domain. For example, the different domains may tag the text as follows:

(1) {domain} Books, {command} Purchase Book, {media name} "hunger games," {media type} BOOK
(2) {domain} Movies, {command} Purchase Movie, {media name} "hunger games," {media type} MOVIE
(3) {domain} Music, {command} Play Album, {media name} "hunger games," {media type} ALBUM A cross-domain ranker would then need to select one of the three as the appropriate result for downstream processing, such as by a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

As virtual assistants become more open and connected it is desirable to expand their NLU capabilities and enable them to understand a larger set of natural language queries. As can be appreciated, however, each time new functionality is enabled for a system operating according to the multi-domain architecture, a new NLU pipeline must be constructed for that particular functionality, thus slowing the ability of the system to incorporate such new functionality. To add new functionality may involve a laborious human-intensive process for defining labels of interest (including entity types and intents) for a given domain that relies on intuition, language expertise, and understanding of a set of desired system actions for adding the capability/domain. The domain definition process is initiated by the annotation specifications—the semantic representation for annotating spoken language data (aka annotation schema). This can take several weeks for a complex domain like Local Search and needs multiple iterations across a data pipeline and NLU modeling teams. The annotation specifications may include a set of annotated example utterances for every intent and slot combination. The above approach often results in domains with very little coverage, inconsistent schemas across domains (for example—"what's coldplay's latest album" may be tagged as QAIntent with every label is part of the Question slot whereas the utterance "play coldplay's latest album" may be tagged as PlayMusicIntent with ArtistName and MediaType slots). Entities in similar context are marked up differently which causes inconsistencies in modeling and inflexibility in refining the definitions for new tasks due to the coupling of application-specific logic with semantic interpretation.

To improve the system's ability to incorporate new functionality, and to free the system from domain specific NLU operations, offered is a system that offers domain agnostic intent classification and named entity recognition. In particular, offered is a fine-grained natural language understanding (FG-NLU) technique that may use a model that learns to map from natural language statements to a fine-grained parse consisting of a command and a set of entity types. Instead of predicting commands and entities from within a small domain-specific set, FG-NLU shares information by leveraging (and extending) large-scale ontologies. In addition, by training hierarchical command and entity type models, FG-NLU is able to predict a multi-granularity path through the reference ontology. A hierarchical approach for intent recognition has comparable accuracy to baseline and multinomial models, while at the same time being faster to train. Jointly classifying commands and entity types using global features and command-entity type constraints may result in improvements in accuracy of results.

One of the main challenges in expanding their capabilities is the lack of a common representation that can provide different levels of granularity, and the ability to bootstrap new features quickly. Offered are techniques to expand NLU, for example using a common representation based on large-scale ontologies and hierarchies. Each command and entity-type is linked to a location in the hierarchy and results in a coarse to fine-grained representation. In addition, offered is fine-grained natural language understanding (FG-NLU), which provides both generic and specific classes and can enable new features to be bootstrapped quickly.

Figure 3:
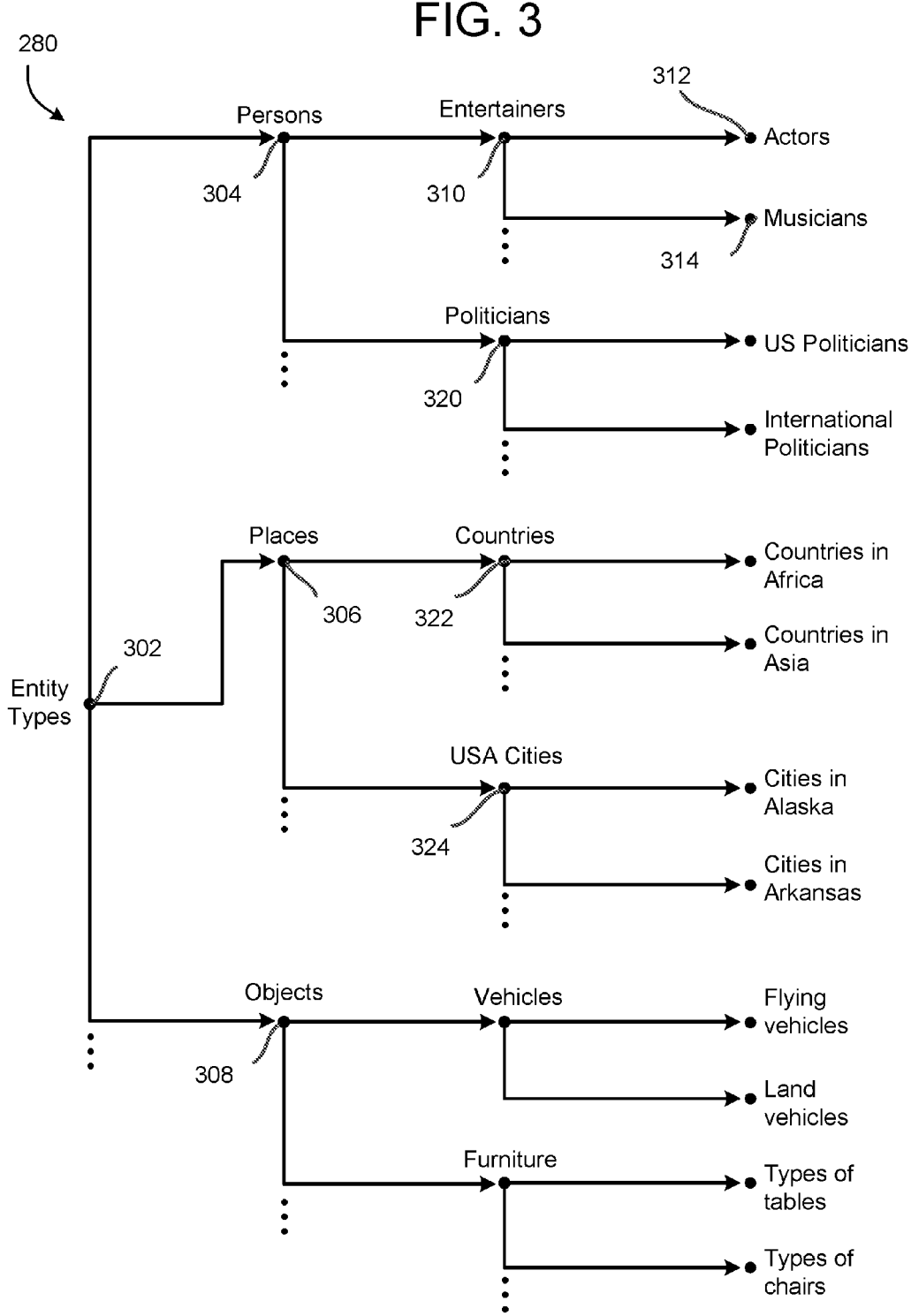
FIG. 3 illustrates a hierarchical representation of entities according to embodiments of the present disclosure.

The fine-grained representation of intent command or entity type may be taken from a hierarchical representation of such commands and entity types. That hierarchical representation may then be used to perform the NLU operations discussed herein in a domain-agnostic manner. FIG. 3 illustrates an example of a hierarchy 280 of entity types. As shown, all entity types may be linked to a root node 302 for entity types. Entity types are then organized according to categories, such as persons 304, places 306, objects 308, etc. Sub-categories may also exist (such as entertainers 310, politicians 320, etc. being sub-categories of persons 304) with some low level category of entity type located at some point in the hierarchy below the root node. Thus, a particular entity type may be represented by its node on the hierarchy 280, which may include a hierarchical indication of how the entity type relates to the root node. The entity type representation may also have finer levels of representation to represent different categories, for example /person/artist/musician/composer may be used to represent a composer. Further, the entity type hierarchy may also include types that are associated with parts of text used to interpret commands but may not necessarily correspond to specific entities, such as enumerations, intangibles, and other items that do not specifically correspond to an entity.

The hierarchy of entities may be stored in the knowledge base 272. Data regarding the specific entities themselves (278) may be also be stored in the knowledge base 272. Each entity may be associated with an entity ID as well as with one or more nodes in the entity type hierarchy. For example, data regarding the entity Madonna the singer may be associated with both node 312 (Actors) and node 314 (Musicians) in the entity type hierarchy 280. by /Persons/Musicians/Madonna or the like. As can be appreciated, FIG. 3 is only an example of a hierarchical representation of entity types, and other configurations/organizations can be used.

Figure 4:
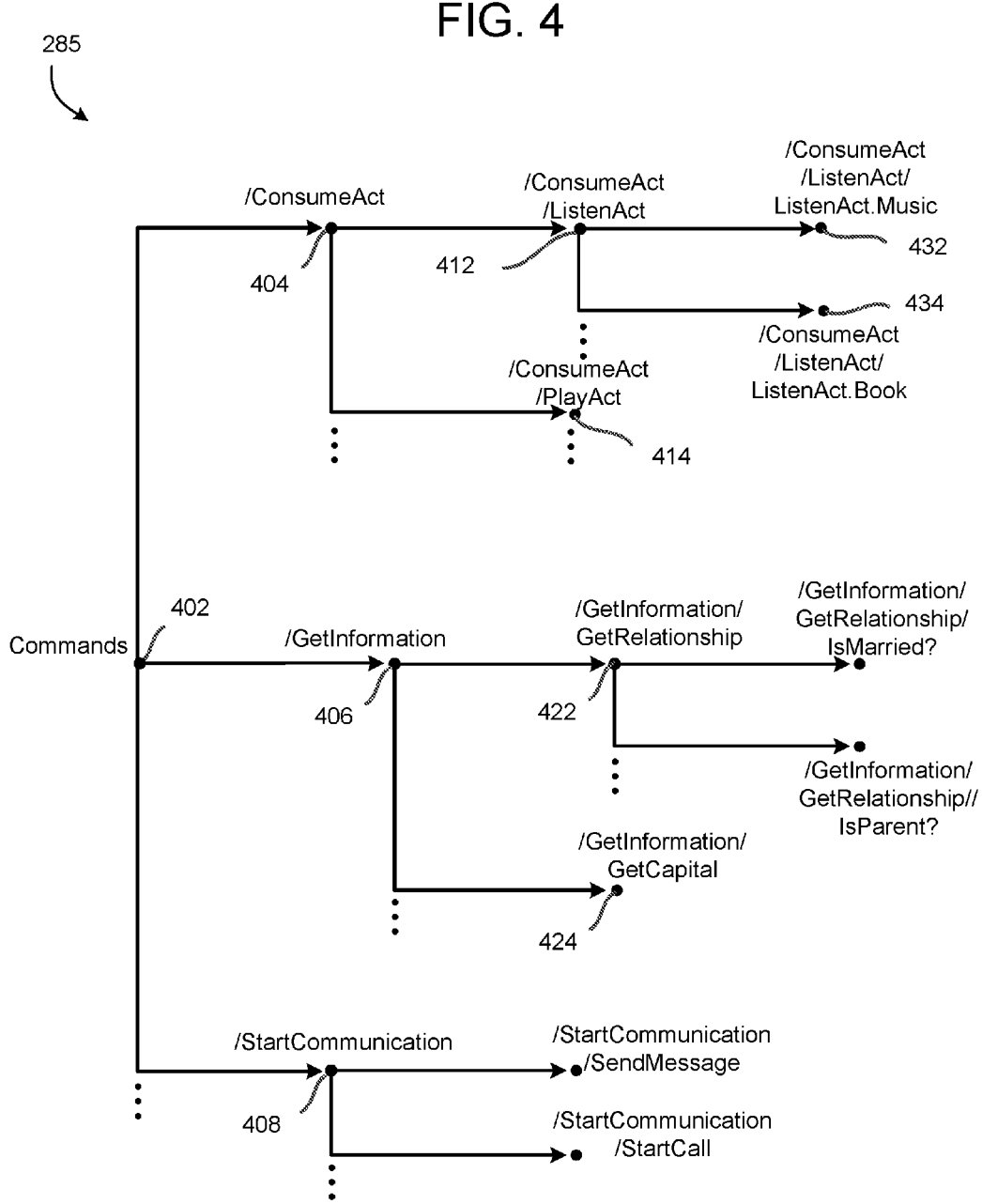
FIG. 4 illustrates a hierarchical representation of intents/commands according to embodiments of the present disclosure.

A hierarchical representation may also be made for commands, where the commands may be computer executable intents (i.e., corresponding to commands executable by the system). FIG. 4 illustrates an example of a hierarchy 285 of commands. As shown, all commands are linked to a root node 402 for commands. Commands are then organized according to categories, such as /ConsumeAct 404, /GetInformation 406, /StartCommunication 408, etc. Sub-categories may also exist (such as /ConsumeAct/ListenAct 412, /ConsumeAct/PlayAct 414, etc. being sub-categories of /ConsumeAct 404) with individual commands located at some point in the hierarchy 285 below the root node. Each command may be represented not only with some command ID indicating the specific command (such as /ConsumeAct/ListenAct/ListenAct.Music) but also with a hierarchical indication of how the command relates to the root node. For example, command ListenAct.Music may be represented by /ConsumeAct/ListenAct/ListenAct.Music or the like. The command hierarchy 285 may be stored in NLU storage 273, or in other storage accessible by the system. As can be appreciated, FIG. 4 is only an example of a hierarchical representation of commands, and other configurations/organizations can be used.

To construct entity type and command hierarchies such as those illustrated in FIGS. 3 and 4, the system may make use of a wide variety of data sources, such as web data sources, previous knowledge stores, the knowledge base 272, or other sources. Using such sources, it is possible to learn robust models of entities and relations that can be used to provide a broad baseline understanding of the types of entity types and commands customers want a system to understand. The hierarchical approach may reduce the number of times specific concepts may need be modeled (for example, time may be modeled once instead of multiple time across multiple domains such as notifications, weather, calendar, etc.).

As NLU processing continues for an incoming utterance, the system may navigate the hierarchy of entity types, for example, from person, to entertainers, to musicians, to identify the particular entity type referred to in incoming text. Similarly, as NLU processing continues for an incoming utterance, the system may navigate the hierarchy of commands, for example, from ConsumeAct, to ListenAct, to ListenAct.Music, to identify the particular command called for in incoming text. The incoming text, entity type and/or command selected from the hierarchy may then be used to perform entity resolution to identify the particular entity referred to in the incoming text. The command may then be executed using the specific entity. As can be appreciated, in other NLU systems the command ListenAct.Music may be considered part of a music domain whereas the command ListenAct.Book may be considered part of a book domain but in the present system the commands are grouped together under the same command category /ConsumeAct/ ListenAct. This hierarchical grouping approach may allow for the commands to be scored relative to each other in a same process (as explained below in reference to FIG. 8) rather than being scored separately by different parallel domain pipelines.

Fine-grained spoken language understanding (FG-NLU) is a model for natural language understanding. FG-NLU takes as input a natural language statement (i.e., text output from an ASR component) and outputs a parse which includes a command and a set of entities from an utterance, along with their location in the utterance. Commands and entity types may be represented in a hierarchical according to a hierarchy such as those discussed above. Hierarchical classification includes top-down classification, structured approaches as well as approaches to regularize across the hierarchy. Semantic parsing can produce a logical form, a frame-semantic parse or, in natural language understanding, a domain, intent and entities. Certain embodiments expand the latter, which includes both a common hierarchical representation as well as models that can predict this hierarchical representation.

Table 1 below represents several example utterances with their corresponding commands and entities (noted next to the word of the text corresponding to the entity) represented in hierarchical form:

TABLE 1

Examples of hierarchical commands and entity types derived from hierarchical representations in large-scale ontologies.

| utterance: | play bluegrass music |
| command: | /ConsumeAct/ListenAct/ListenAct.Music |
| entity types: | "bluegrass"–+ /product/creative work/genre/music |
| | "music"–+/product/creative work |
| utterance: | i would like to listen to isle of joy book now |
| command: | /ConsumeAct/ListenAct/ListenAct.Book |
| entity types: | "isle of joy"–+ /product/creative work/written/book |
| | "book"–+ /product/creative work |
| utterance: | play pandora |
| command: | /ConsumeAct/ListenAct/ListenAct.Music/ListenAct.Station |
| entity type: | "pandora"–+/organization/company |

As can be appreciated, larger categories of entity types or commands may be represented at different levels of the hierarchy. For example, for the first utterance "bluegrass" is represented as /product/creative work/genre/music whereas "music" is represented as /product/creative work. Thus, the hierarchical representations of the entity type shows that bluegrass is a sub-category of music. By modeling commands and entity types in a hierarchical manner, the system may be configured to perform actions such as intent/command classification and named entity recognition in a domain agnostic manner.

Figure 5:
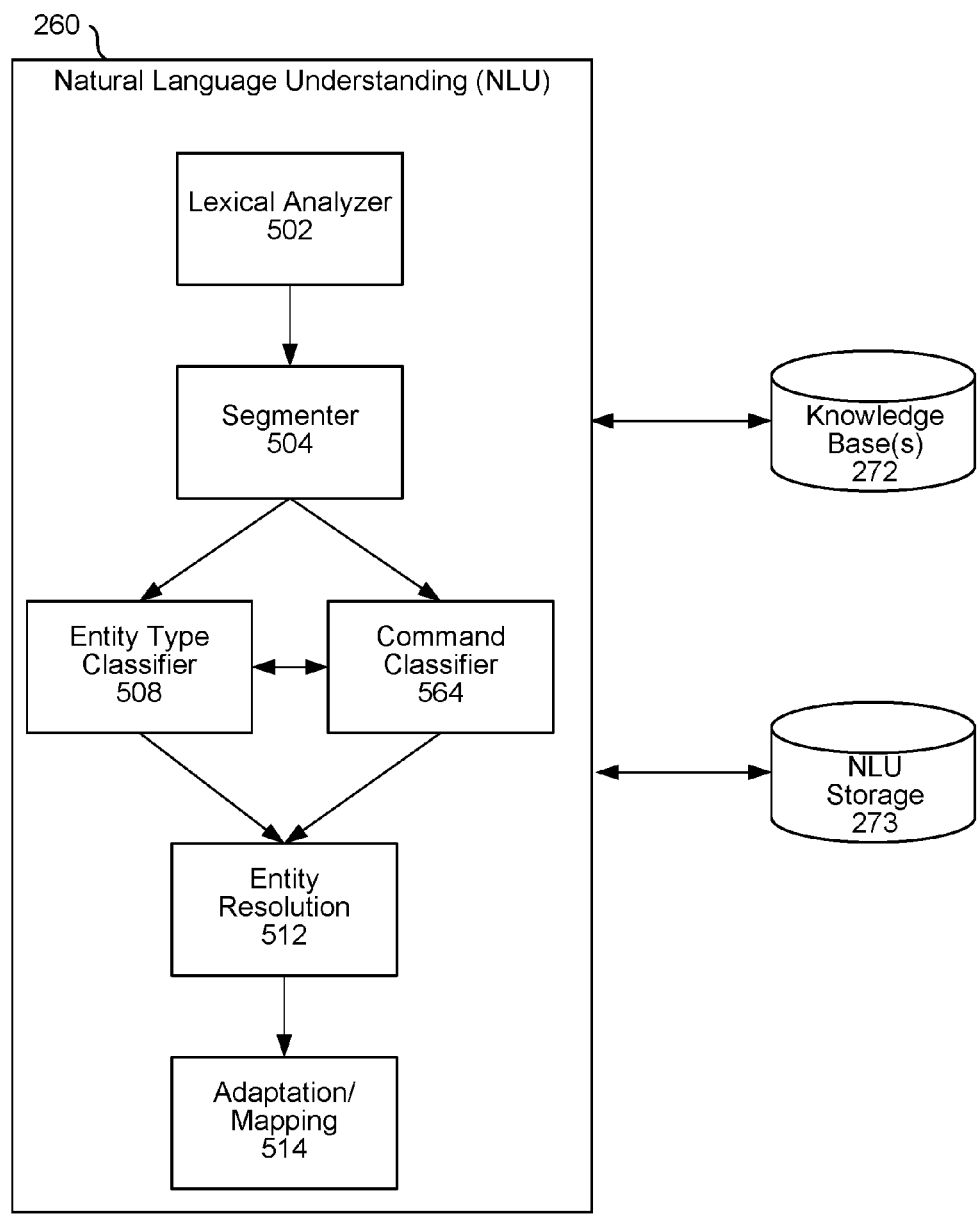
FIG. 5 shows a domain agnostic architecture for performing natural language processing according to embodiments of the present disclosure.

Thus, the FG-NLU approach allows mapping of natural language utterances in a manner which can show a hierarchical command and a set of hierarchical entity types. As shown in FIG. 5, a FG-NLU process may include various components. The lexical analyzer component 502 may receive input text (such as output from an ASR component 250) and may parse and tag the text according to its parts of speech (e.g., identify subject, object, verb, preposition, etc.) or other lexical characteristics based on rules and/or models operated by the lexical analyzer 502. The tagged text may then be sent to a segmenter 504. The segmenter 504 takes the lexically analyzed text and produces a set of segments corresponding to the location of the named entities or other text in the lexically analyzed text that can be used to execute the command. The segmented text, along with other data such as the input text, context data, user data, gazetteer information, etc. may then be sent to the command classification component 564 and entity type classifier 508. The command classification component 564 takes the input and produces the corresponding intent of the user/command to be executed. The entity type classifier 508 takes the input and produces a hierarchical classification for each segment of text identified by the segmenter 504 (where the hierarchical classification may correspond to an entity type or other text type from the hierarchy of entity types 280). Both the named entity type and command models are hierarchical models that produce a coarse to fine-grained classification. Each can be trained either as a log-linear model or a support vector machine (or other classifier). The entity type selections and determined command may then be passed to an entity resolution component 512, which then identifies the specific entities referred to in the input text. The specific entity, command and other data (such as the input text) may then be passed to an adaptation/mapping component 514 which then prepares data for downstream operation by an appropriate command processor 290 for execution. Operation of the different components of FIG. 5 may operate as described below.

The lexical analyzer 502 operates to construct a lexical, syntactic and semantic analysis of the input text. These analyses can be realized in the form of annotations over the original input query text and can be used as features in downstream tasks. This module converts the input spoken form text to a representation that can be consumed by the downstream NLU components. This representation form is the same representation that was used to train the NLU models used at runtime. The lexical analyzer 502 may perform the following tasks:

Formatter: This component is responsible for normalizing the input tokens from the ASR utterance. These could involve transformations for:
  date/time/currency/numbers (example: "two oh one" can be transformed to 201 or 2:01)
  spelling correction
  removing morphological variations ("playing" maps to "play")
  transformations to a written form ("u two" maps to "U2")
Parts-of-speech tagging: These analyze the text associated with the tokens to generate part of speech tags, dependency parses of the input sentence as well as frame semantic parses. These can be used downstream as features for the various information extraction steps.

Figures 6, 7A, 7B:
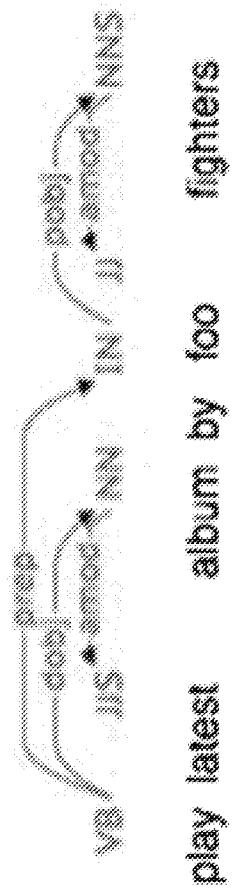
FIG. 6 illustrates lexically analyzed text according to embodiments of the present disclosure.
FIGS. 7A and 7B illustrate segmented text according to embodiments of the present disclosure.

As an example, FIG. 6 shows the text "play latest album by foo fighters" tagged as lexically analyzed text. The tags (e.g., data indicators) show that the certain parts of the text have been tagged, for example "play" is a verb (VB), "by" is a preposition (IN), "foo fighters" is a plural noun phrase (NNS), "album" is a singular noun phrase (NN), etc.

The segmenter 504 is a coarse-grained chunker and is responsible for extracting segments of text within the input text that correspond to entities and potentially associating those segments with their associated types. The segmenter 504 is coarse-grained as in the goal is not to identify the specific entity, but just to point to the correct span of entities (for example, perhaps one sub-category down from the root node in an entity or intent hierarchy). For example, FIG. 7A shows the text with segments indicated by the segmentation component 504 in brackets. The segmentation component 504 may also perform some very high level type classification of the segments. The segmenter 504 may also tag other words that may not necessarily correspond to an entity, but may affect the execution of the command of the intent. For example, the segmentation component 504 may indicate that a certain segment corresponds to a person, or a place, or an enumeration, etc. In the example of FIG. 7B, "latest" and "album" represent enumerations, i.e. words that represent a finite number of values. Enumerations, intangibles, and other items that do not specifically correspond to an entity may also be included in the hierarchy of entity types 280, such as that illustrated in FIG. 3. As an example of such high level classification, the segmentation component 504 may produce an output such as that shown in FIG. 7B, where "latest" is marked as an enumeration [$latest_{ENUM}$], "album" is marked as an enumeration [$album_{ENUM}$], and "foo fighters" is marked as a person [foo $fighters_{PER}$].

The segmenter 504 can work in a domain agnostic manner to identify an entity mention/sub-category. The segmenter 504 may refer to the knowledge base 272 to perform high level categorization, for example in distinguishing whether text corresponds to a person, place, or the like. The segmenter 504 may be implemented as a particular classifier, such as a conditional random field (CRF), recurrent neural network (RNN), a long short-term memory (LSTM) model or other classifier.

The command classifier 564 classifies the intent/command of an input text, similar to an IC module, only in a domain agnostic way using hierarchical representations of commands such as those explained above in reference to FIG. 4. The output of the command classifier 564 may be the best path through the command hierarchy that corresponds to the input text. The command classifier 564 may be implemented as a log linear model (LLM) or other classifier. The command classifier 564 may correspond to a hierarchical representation of commands, such as a hierarchy such as 285, where the command classifier 564 is capable of scoring commands and/or categories that may be unrelated (e.g., where one category does not overlap another), but are linked in terms of how each command and/or category relate to a root node (e.g., 402) or other structure linking the commands.

Figure 8:
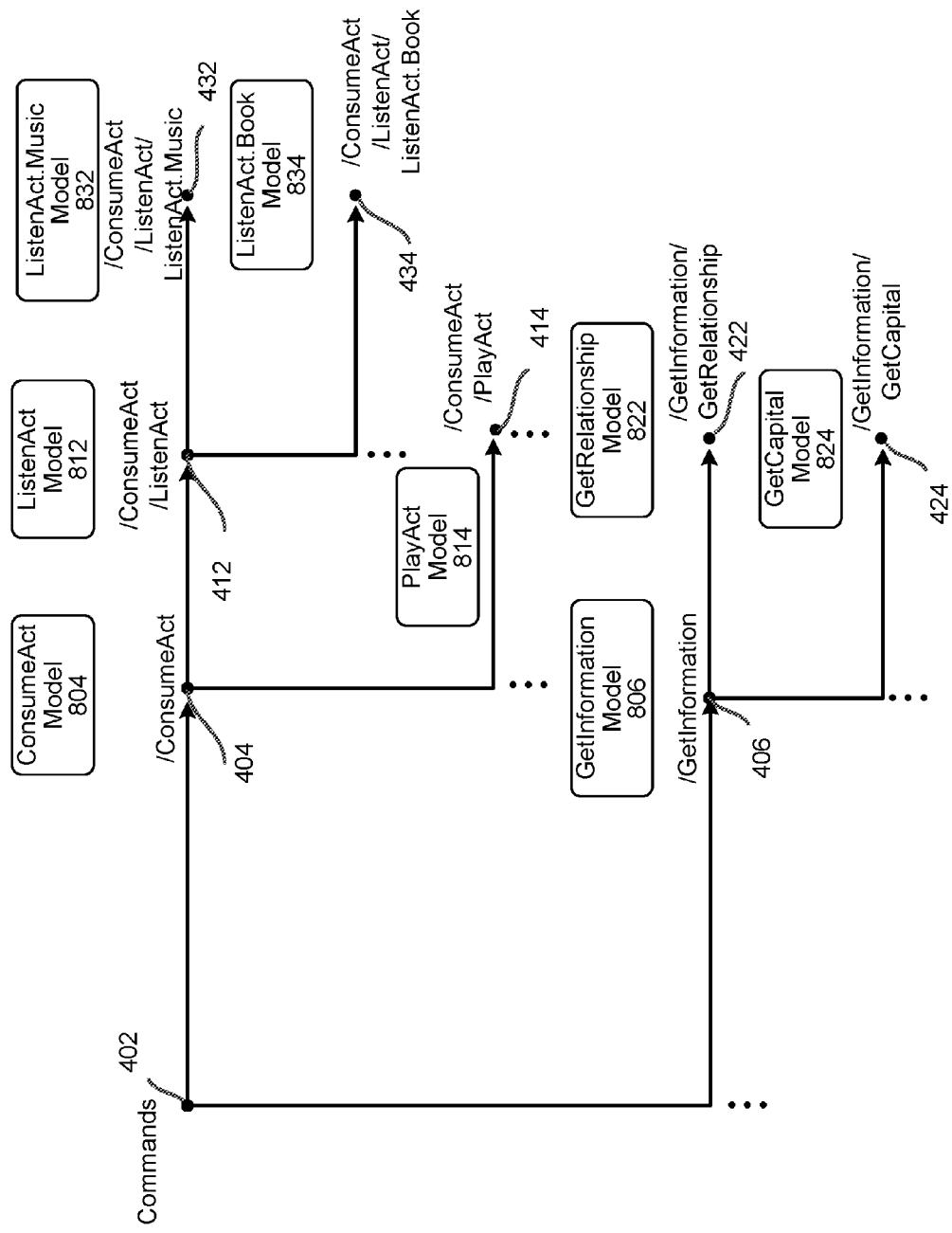
FIG. 8 illustrates a hierarchical representation of intents/commands with corresponding trained models according to embodiments of the present disclosure.

To determine the best path through the command hierarchy, the command classifier 564 may use the input provided to the command classifier 564 (which may include the input text, data from the segmenter 504, data from the entity type classifier 508, knowledge base 272, or other information) and may process that data using one or more models associated with different nodes of entity command hierarchy. For example, as discussed above in reference to FIG. 4, a command hierarchy may include many different sub-categories of different commands arranged in a logical manner. Each sub-category or actual command, each represented by a node in the hierarchy, may be associated with a model that is trained on text (and other data such as output from a segmenter 504) to recognize when the text is associated with that particular sub-category or command. The command classifier 564 may use the corresponding model when determining a score for the particular node. For example, a portion of the hierarchy of FIG. 4 is shown in FIG. 8. As shown in FIG. 8, nodes of the command hierarchy may each have their own model associated with the respective node. For example, the /ConsumeAct node 404 may be associated with the ConsumeAct Model 804, the /ConsumeAct/ListenAct node 412 may be associated with the ListenAct Model 812, and so on. As the command classifier 564 processes incoming text, it may traverse the hierarchy structure using the input text and the node models to determine which path through the hierarchy most closely relates to the input text. Once a particular command is reached, and the system determines that the command sufficiently corresponds to the input text (such as through a correlation score determined using the intent's model and the input text), the command classifier 564 may declare that command as the resulting command.

For example, a command classifier 564 may receive, from the segmenter 504 (or other source), input text, an indication that a certain word of the text corresponds to an entity mention and/or other data. For illustration purposes, the input text may correspond to a request to play music (for example "play the latest album by the foo fighters"). The command classifier 564 may take the input text, the data from the segmenter 504 (and other data) and process that text using a model corresponding to a command category, for example ConsumeAct Model 804. The result of that processing may be a first score. The command classifier 564 may also process the text using a different model corresponding to a different command category, for example GetInformation Model 806. The result of that processing may be a second score. The command classifier 564 may determine that the first score is higher than the second score, thus indicating that the command corresponding to the input text may be more likely to relate to an intent that is part of the /ConsumeAct category than the input text is to relate to a command that is part of the /GetInformation category.

The command classifier 564 may also determine that the /ConsumeAct node does not correspond to an actual command (meaning an end of a branch of the command hierarchy) but rather to a category of commands. The command classifier 564 may then continue down the path of /ConsumeAct. The command classifier 564 may then process the input text using a model corresponding to intent command subcategory within the /ConsumeAct portion of the command hierarchy, for example ListenAct Model 812. The result of that processing may be a third score. The command classifier 564 may also process the text using a different model corresponding to a different command sub-category, for example PlayAct Model 814. The result of that processing may be a fourth score. The command classifier 564 may determine that the third score is higher than the fourth score, thus indicating that the command corresponding to the input text may be more likely to relate to a command that is part of the /ConsumeAct/ListenAct sub-category. The process may continue until the command classifier 564 has processed the input text using the model for a command, such as the ListenAct.Music Model 832, and determined a score sufficient to identify the input text as corresponding to a particular command, in this example, /ConsumeAct/ListenAct/ListenAct.Music. To select a particular command the system may compare the score for a node corresponding to the command to scores for other nodes. Those other nodes may correspond to other commands or may correspond to command categories. It may be possible for a command category to receive a highest score, in which case the system may select the particular query for disambiguation, where the system may request additional information from the user prior to selecting a command.

The command classifier 564 may perform similar processing for many different command categories and sub-categories, and may even traverse down many paths simultaneously, and may arrive at different scores for different commands, at which point the command classifier 564 may select the highest scoring command as the one corresponding to the input text. Other techniques for traversing the command hierarchy may also be used using processes known in the art for traversing such graphs (such as pruning, rescoring, etc.). Further, while the command hierarchy is illustrated as having a single model for each node, the system may also be constructed so that a single model may be used to traverse (and score) the entire command hierarchy graph (or portions thereof) using the data input to the command classifier 564. Thus a single model may be used to score many different command categories and commands, even for commands that may traditionally be considered part of different NLU domains. Further, the scoring described above for nodes on the hierarchy may be done relative to other nodes on the hierarchy. Thus, the score of a particular command category may be normalized relative to the scores of other categories at the same level of node in the hierarchy. Further the score of a particular command category may be normalized relative to the scores of subcategories within the command category.

Once the system has identified the portions of the text that correspond to entity mentions, the goal of the entity type classifier 508 is to disambiguate the mention type (for example in the utterance "play songs by foo fighters", the entity disambiguation stage will assign the entity type ArtistName to the mention "foo fighters"). The entity type classifier 508 may be implemented as a log linear model (LLM) or other classifier. The output of the entity type classifier 508 may be the best path through the entity type hierarchy that describes the portion of input text indicated by the segmenter to correspond to an entity type. The entity type classifier 508 may correspond to a hierarchical representation of entity types. By decoupling the disambiguation type from the segmentation problem models can be built that are focused on identifying a particular entity type. These disambiguation models can be re-used to automatically detect mention types across utterances in multiple domains, and the system can predict a set of overlapping types for each mention. The choice of modeling the disambiguation models as a classifier or scorer facilitates re-use across different domains. For example, in a software developer's kit (SDK) developers may choose to use pre-built slot models that have been trained on much larger datasets to automatically identify the mentions in example utterance text, regardless of domain.

Figure 9:
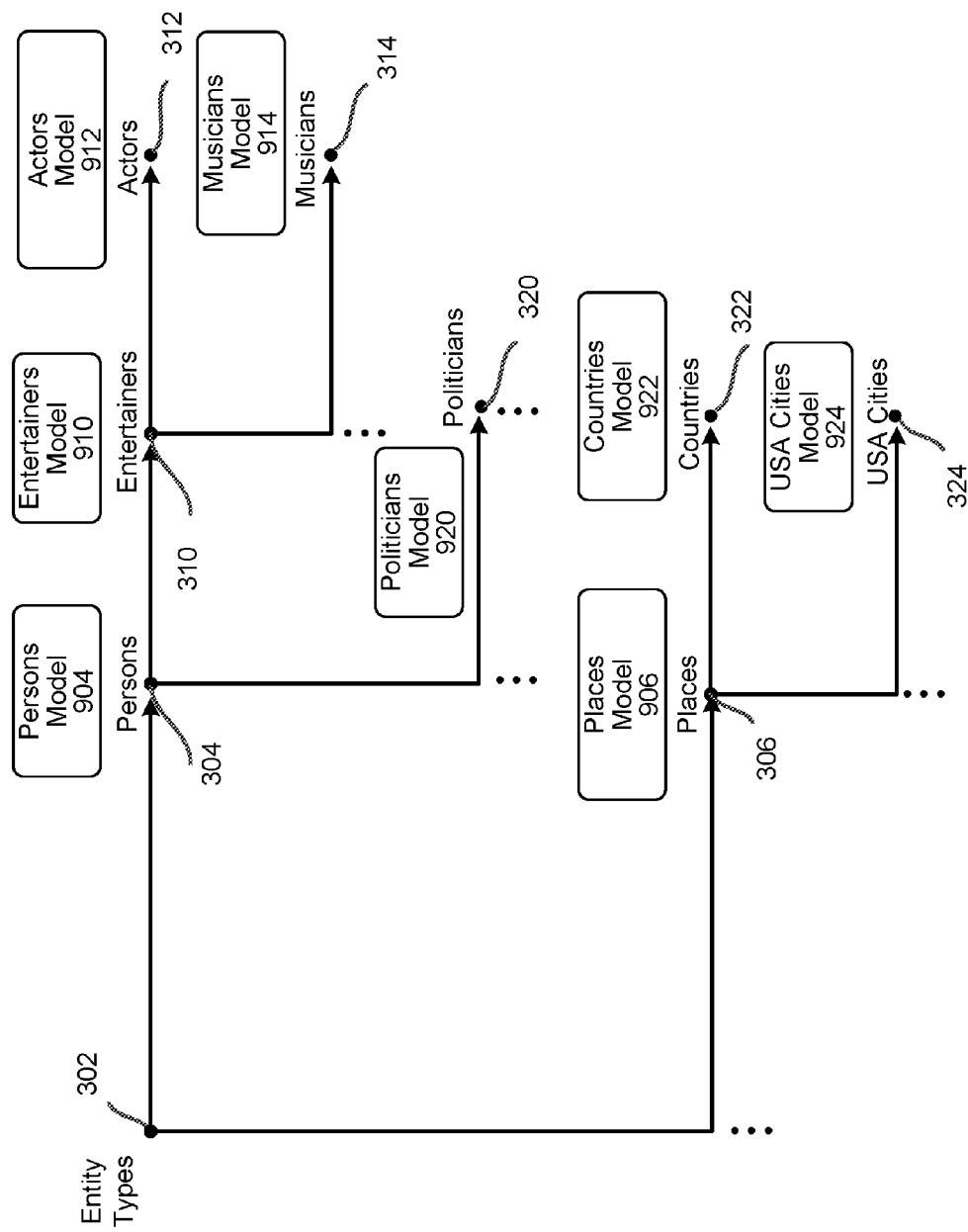
FIG. 9 illustrates a hierarchical representation of entity types with corresponding trained models according to embodiments of the present disclosure.

As explained above in reference to FIG. 8 where the command classifier 564 may traverse an intent hierarchy graph, the entity type classifier 508 may traverse an entity type hierarchy graph in a similar manner, where each node of the entity type hierarchy graph may also be associated with a particular model that can be used to process incoming text to determine how closely the text relates to that branch/entity type of the entity type hierarchy. For example, as shown in FIG. 9, each node of an entity type hierarchy may be associated with a model that may be used to score incoming text as corresponding to that particular node. At runtime, the entity type classifier 508 may process incoming text using one or more models associated with the entity type hierarchy to arrive at one or more desired nodes of the entity type hierarchy. For example, in certain situations multiple nodes may have high correlations scores to the incoming text, and thus multiple entity types may be output by the entity type classifier 508 as potentially corresponding to the input text. In certain situations, however, the desired node may correspond to a category or sub-category that is not at the very end of the entity type hierarchy. For example, if incoming query text includes "what movies came out in 2010?" the system may determine that a node corresponding to "movies" (which may be a subcategory) but not a terminal node of the hierarchy, is the desired destination node rather than a node corresponding to a more specific type of movie (such as comedy, adventure, or the like).

The individual entity type/command models may be trained using examples of query text where the command and/or entities (and entity types) referred to in the example query texts are known. These may form the ground truth as indicating whether a particular input text corresponds to a particular node on the entity type hierarchy/command hierarchy. Using such query text examples will allow the system to develop robust models that may then be used at runtime to score input text as relating to a particular node on the entity type hierarchy and/or command hierarchy.

Additional data that may be used to train the command classifier 564, the entity type classifier 508, the intent models and/or the entity models (and may be used at runtime to determine an entity and/or intent) may include N grams, word embeddings related to the input text, word string embeddings, gazetteer features (which may correspond to a particular user ID or user profile), parts-of-speech tags, data from the segmenter 504, or other data.

Once one or more entity types are determined, the entity resolution component 512 may identify what specific entity is referred to a particular slot. The entity resolution component 512 may use the entity type designations (and corresponding scores) from the entity type classifier 508, the determined command from the command classifier 564, the input text, information in the knowledge base 272, or other data to specifically identify an entity.

An adaptation/mapping component 514 may be used to map processed input text (include a representation of an entity, entity type, and/or command in the hierarchical form) into a form that may be used by a command processor 290 for eventual execution of the desired command. The adaptation/mapping component 514 may use a rule-based process to convert the text into a form usable by a downstream application, and/or the adaptation/mapping component 514 may use a probabilistic approach by learning a translation model using annotated examples provided by an application developer. Other techniques may also be used.

As illustrated in FIG. 5, components of the NLU component 260 may be configured to interface with the knowledge base 272 to improve operations. For example, during runtime the entity type classifier 508 and/or the command classifier 564 may interact with the knowledge base 272 to assist in determining an entity type or command. This may be done in a number of ways to influence the decision of the entity type classifier 508 and/or the command classifier 564.

Certain knowledge bases are entity centric and there is no encoding of actions other than those in information requests such as question type utterances (example: "what is the capital of france", "capital_of" is the relation and can be considered as the intent of the request). While a knowledge base may encode relations between entities, which can be used to represent the command, the system may still need to define the actions for transactional queries and add them to the knowledge base 272 or NLU storage 273. Here the system may use a combination of heuristics and rules as well as clustering methods to define candidate entries for adding actions to the knowledge base 272. Given these actions already defined in the knowledge base 272, intent/command classification can then be thought of as a relation extraction task.

There are several benefits to interacting with the knowledge base 272 during NLU processing. First, by decoupling the segmenter 504 from the disambiguation done by the entity type classifier 508 and command classifier 564, the different components may be developed independently and apply different local and global knowledge data sources during processing. The architecture encourages re-use of the already trained entity and intent models, and so adding a new function to the system may be relatively easy as compared to a multi-domain configuration. As a knowledge base 272 may be included, the large ontology of facts in an existing knowledge base may allow a large number of entities to be modeled based on actual utterances. Integrating the knowledge base into the NLU architecture for reference during NLU processing may also improve the ultimate result.

Formally, FG-NLU may use a model that predicts an intent/command (I), a set of entities (S) and a segmentation (L) given an utterance text (Z) and model parameters ($\theta$). FG-NLU factors into three primary components: segmentation ($f_{seg}$), named entity classification ($f_{slt}$), and intent classification ($f_{int}$).

$$f(I,S,L;Z,\theta) = f_{int}(I;Z) + f_{slt}(S;L,Z,\theta) + f_{seg}(L;Z,\theta) \quad (1)$$

The first two components, the intent model ($f_{int}$) (corresponding to command classifier 564) and entity model ($f_{slt}$) model (corresponding to entity type classifier 508), are modeled hierarchically. The third component, a segmenter ($f_{seg}$) (corresponding to segmenter 504), produces the location of named-entity types within the utterance. An example of the input and output of segmenter is shown in Table 2. This is expressed as a linear function to highlight the fact that it could be trained as a structured perception or support vector machine (SVM) as well. For illustration, the log-linear model is described.

TABLE 2

An example of a segmentation given an utterance.
In this case, "bluegrass" and "music"
extracted from the utterance as candidate named entities.

| utterance: | play bluegrass music |
|---|---|
| segmentation: | "bluegrass"→segment "music"→segment |

Intents/commands and entities are modeled hierarchically. For intents, the entire utterance (Z) is input to the model and the output (I) is a sequence of nodes ($i_j$) from the root node to an intermediate node or a leaf (i.e., an end of a path through a hierarchy corresponding to a specific command). For $\varphi$ a feature function, $\theta$ the model parameters, $\pi(i_j)$ is the parent node of node $i_j$, then the command model can be formulated either as a log-linear model. When the ontology/hierarchy has j levels, then $f_{int}$ can be formulated as follows:

$$f_{int}(I; Z, \theta) = -\log p(I \mid Z, \theta) \quad (2)$$

$$= -\sum_j \log \frac{\exp^{\theta_{\pi(i_j)} \cdot \phi(i_j, \pi(i_j), Z)}}{\sum_{i_j} \exp^{\theta_{\pi(i_j)} \cdot \phi(i_j, \pi(i_j), Z)}} \quad (3)$$

The named entity component is similar to the command classifier, except that it is conditioned on a segmentation (L) of the input utterance. The segmentation defines a set of named entity segments, where the start token index ($l_{k,s}$) and the end token index ($l_{k,e}$) define the extents of the segment in the original utterance. For each of the k segments in the utterance and the j levels of the ontology, then the resulting model takes the following form:

$$f_{slt}(S; L, Z, \theta) = -\log p(S \mid L, Z, \theta) \quad (4)$$

$$= -\sum_k \sum_j \log \frac{\exp^{\theta_{\pi(s_{k,j})} \cdot \phi(s_{k,j}, \pi(s_{k,j}), l_{s,e}, Z)}}{\sum_{s_{k,j}} \exp^{\theta_{\pi(s_{k,j})} \cdot \phi(s_{k,j}, \pi(s_{k,j}), l_{k,s}, l_{k,e}, Z)}}.$$

The input to the segmentation model is the utterance text, and the output is a segmentation of the input utterance text that defines the start and end location of each named entity (e.g., Table 2). In the example, the entity component of the model would produce segment labels for the "bluegrass" and "music" segments. The segmentation model is trained as a sequential log-linear model, where each label is treated as being first-order Markov.

$$f_{slt}(L; Z, \theta) = p(l_1 \ldots l_n \mid z_1, \ldots z_n) \quad (5)$$

$$= -\log \frac{\exp^{\sum_k \theta_O \cdot \phi(l_k, z_k) + \theta_T \cdot \phi(l_k, l_{k-1}, z_k)}}{\sum_{l_1 \ldots k} \exp^{\sum_k \theta_O \cdot \phi(l_k, z_k) + \theta_T \cdot \phi(l_k, l_{k-1}, z_k)}}$$

Model parameters break down into transition parameters $\theta_t$ as well as observation parameters $\theta_O$.

Although the model could be trained jointly, the computation may be distributed in order to enable fast training. Within the intent and named entity models, each component model may be rained independently. The segmentation model may be trained independently using a Limited-memory Broyden-Fletcher-Goldfarb-Shanno (L-BFGS) technique. The segment tags are appended with a label to indicate whether they are the beginning, inside or outside of an entity (BIO).

Inference is performed using two components: a search for the best segmentation and a search for the best intent and entities given this segmentation. The Viterbi decoding may be used for the segmentation model and the single best hypothesis is used as the segmentation. In parallel, given the intent model, a beam search is performed over the possible paths through the intent hierarchy tree. Similarly, given the segmentation and the intent, a beam search is performed to produce an entity for each segment. The most probable configuration is returned. Constraints between the intent and entities are also (optionally) used to limit the allowable entity types. Features used include n-grams, gazetteers and regular expressions. Regular expressions and gazetteers are only used for the segmentation model. For the named entity models, both the segment n-grams as well as the contextual n-grams (those that are not contained in the segment) are used as features. For the intent model, the features include all n-grams up to length three.

In certain embodiments the offered approach does not have the notion of a domain (i.e., a set of co-existing intents and slots specific to a feature) and hence eliminates the sequential process of manually defining a domain and curating NLU models for it. Instead, the system may focus on modeling entities and intents on utterance text with minimal human annotation, dealing with new combinations of intents and slots, and making it easy for non-experts to add new intents and slots to the system.

Figure 10:
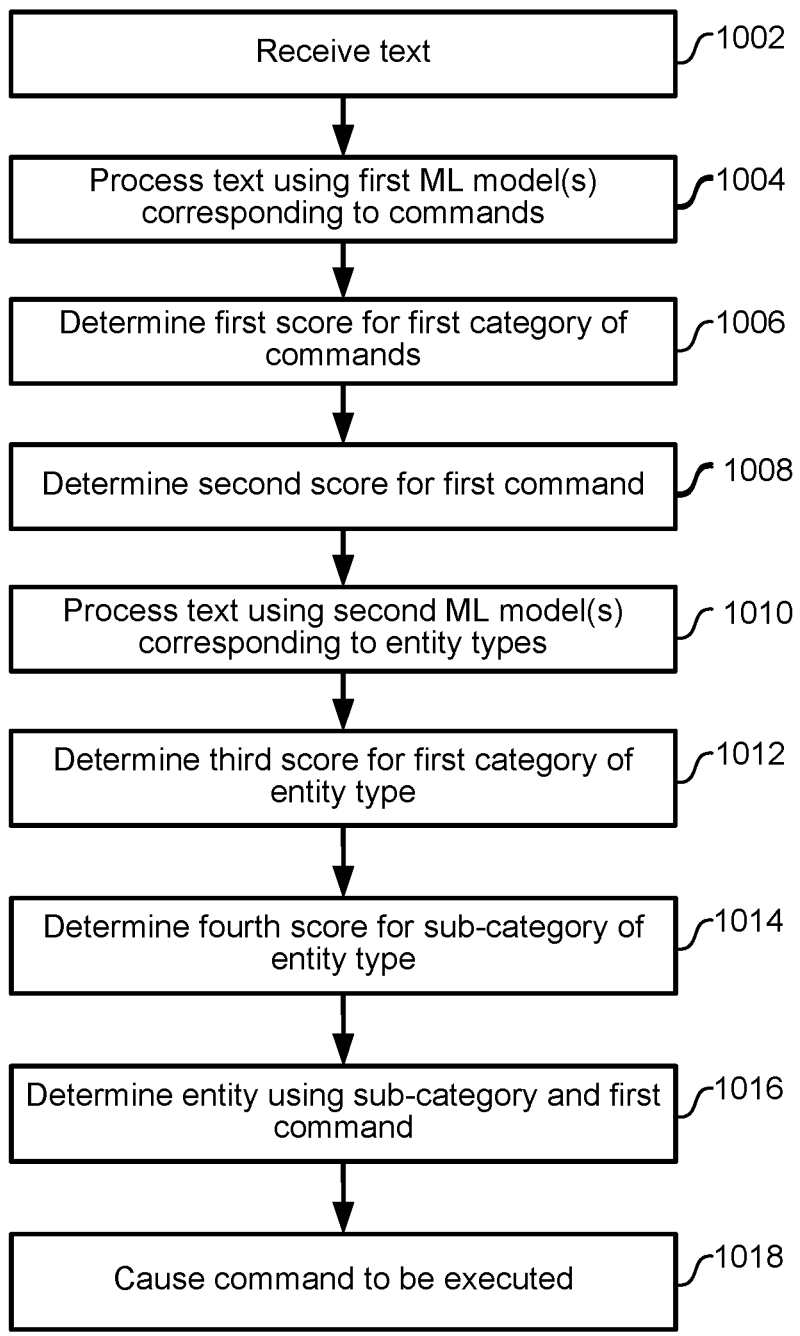
FIG. 10 shows a method for performing natural language processing according to embodiments of the present disclosure.

FIG. 10 illustrates performing NLU according to aspects of the present disclosure. As shown, the system may receive (1002) text corresponding to a user query. That text may be obtained by performing ASR on input audio data. The system may process (1004) the text using one or more first machine learning (ML) models corresponding to a hierarchical representation of commands, such as that illustrated above in reference to FIG. 8. That processing may result in determining (1006) a first score corresponding to a first category of commands and determining (1008) a second score corresponding to a first command within the category of commands. Other scores may also be determined corresponding to other categories or other intents within the linked intent hierarchy. The system may process (1010) the text using one or more second ML models corresponding to a hierarchical representation of entity types, such as that illustrated above in reference to FIG. 9. That processing may result in determining (1012) a third score corresponding to a first category of entity types and determining (1014) a fourth score corresponding to a sub-category within the category of entity types. Other scores may also be determined corresponding to other categories or other entity types within the entity type hierarchy. The system may then determine (1016) an entity using the sub-category and first command. The system may then cause (1018) a command to be executed using the first command and determined entity.

Various machine learning techniques may be used to perform the training of the lexical analyzer 502, entity resolution component 512, adaptation/mapping component 514, segmenter 504, classifier(s) 508, 564 and the command/entity type models. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 11:
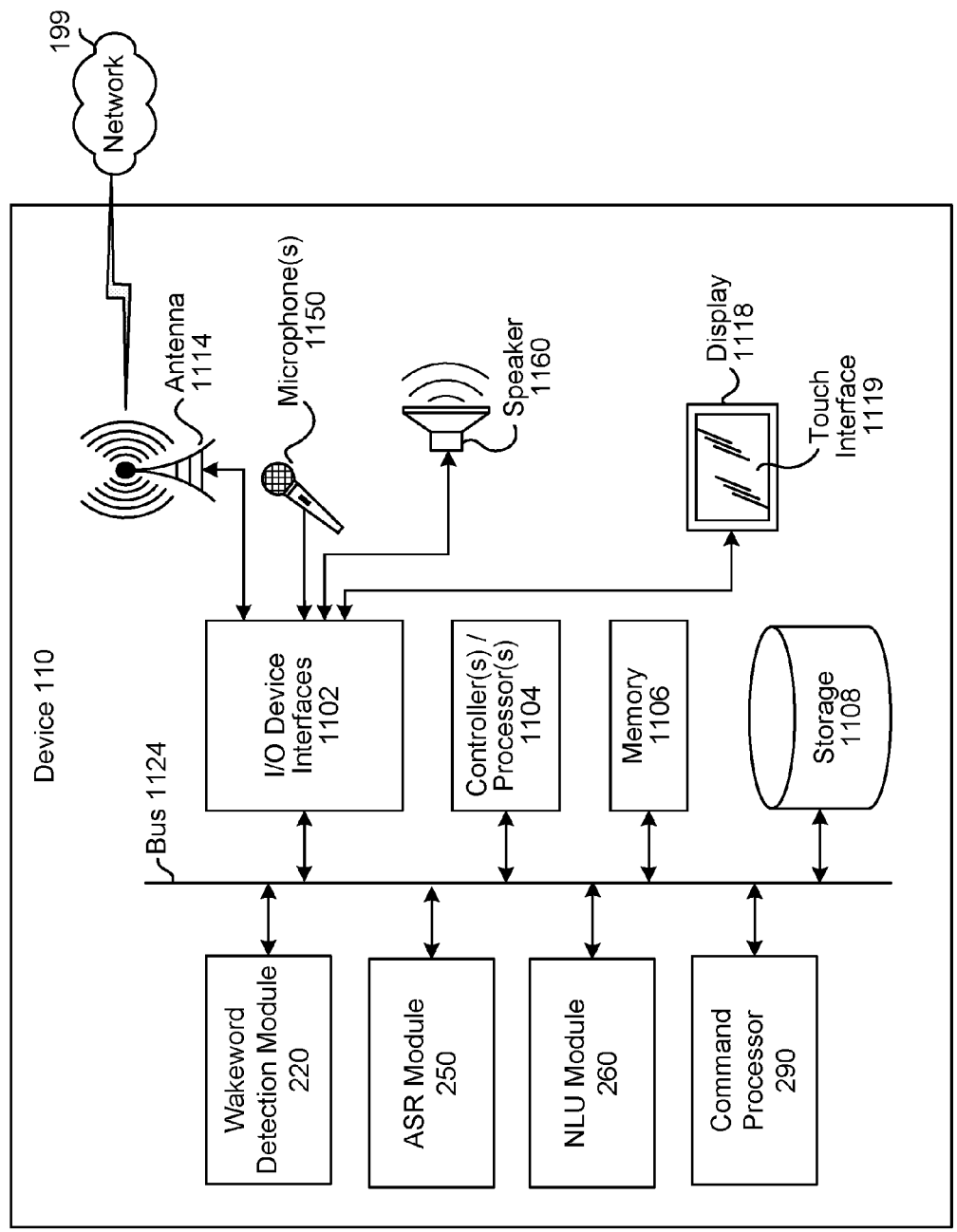
FIG. 11 is a block diagram conceptually illustrating example components of a device according to embodiments of the present disclosure.
Figure 12:
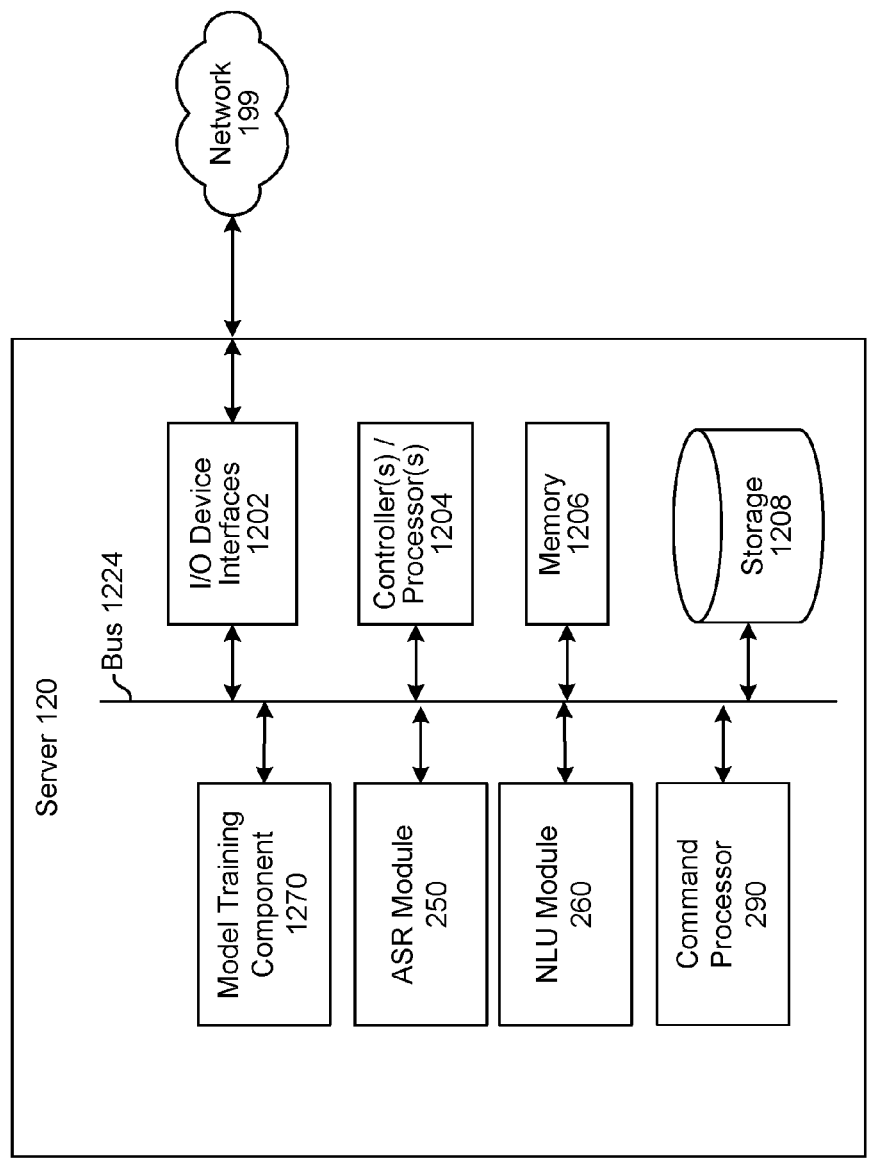
FIG. 12 is a block diagram conceptually illustrating example components of a server according to embodiments of the present disclosure.

FIG. 11 is a block diagram conceptually illustrating a local device 110 that may be used with the described system. FIG. 12 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1104/1204), that may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive (MRAM) and/or other types of memory. Each device may also include a data storage component (1108/1208), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1102/1202).

Computer instructions for operating each device (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120) includes input/output device interfaces (1102/1202). A variety of components may be connected through the input/output device interfaces, as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to the device 110 of FIG. 11, the device 110 may include a display 1118, which may comprise a touch interface 1119. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1102 that connect to a variety of components such as an audio output component such as a speaker 1160, a wired headset or a wireless headset (not illustrated) or other component capable of outputting audio. The device 110 may also include an audio capture component. The audio capture component may be, for example, a microphone 1150 or array of microphones, a wired headset or a wireless headset (not illustrated), etc. The microphone 1150 may be configured to capture audio. If an array of microphones is included, approximate distance to a sound's point of origin may be performed acoustic localization based on time and amplitude differences between sounds captured by different microphones of the array. The device 110 (using microphone 1150, wakeword detection module 220, ASR module 250, etc.) may be configured to determine audio data corresponding to detected audio data. The device 110 (using input/output device interfaces 1102, antenna 1114, etc.) may also be configured to transmit the audio data to server 120 for further processing or to process the data using internal components such as a wakeword detection module 220.

For example, via the antenna(s), the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the lexical analyzer 502, segmenter 504, entity type classifier 508, command classifier 564, entity resolution component 512, adaptation/mapping component 514 and/or other components. The NLU module 260 may also include NLU storage 273, a stored knowledge base 272, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio data and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio data, such as those processed post-beamforming if applicable. Other techniques known in the art of keyword detection (also known as keyword spotting) may also be used. In some embodiments, the device 110 may be configured collectively to identify a set of the directional audio data in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1108 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1108 and compare the captured audio to the stored models and audio sequences using audio comparison, pattern recognition, keyword spotting, audio signature, and/or other audio processing techniques.

The server may include a model training component 1270. The model training component may be used to train the classifier(s)/models discussed above.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 11 and 12, are exemplary, and may be located a stand-alone device or may be included, in whole or in part, as a component of a larger device or system.

Figure 13:
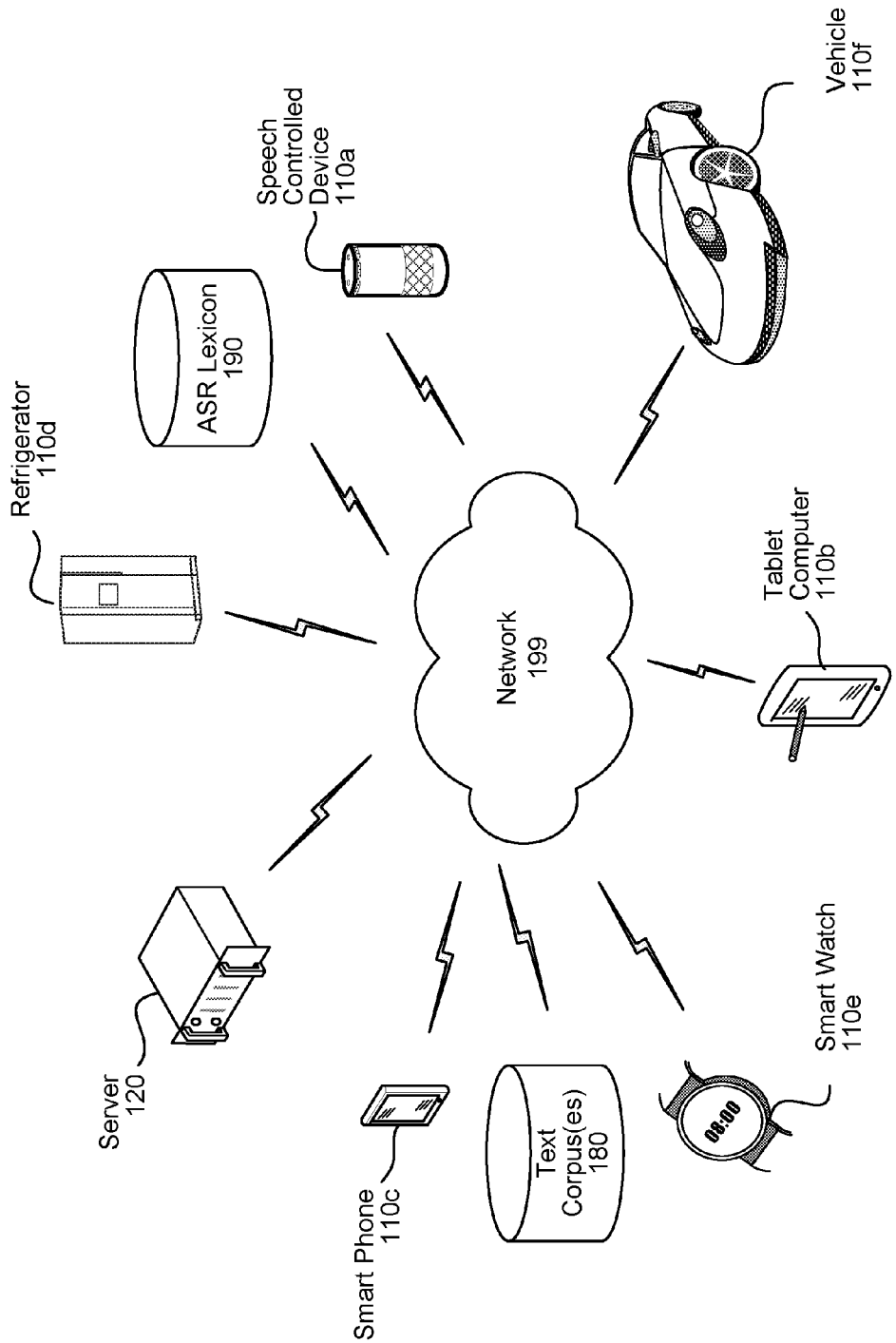
FIG. 13 illustrates an example of a computer network for use with the system.

As illustrated in FIG. 13 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 1150 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving query text corresponding to a natural language utterance;
   determining that first text in the query text corresponds to a command and that second text in the query text corresponds to an entity in a knowledge base;
   accessing at least one first stored data structure representing a hierarchical arrangement of commands, the at least one first stored data structure including:
      first data corresponding to a first category of commands,
      second data corresponding to a first command within the first category of commands,
      third data corresponding to a second command within the first category of commands,
      fourth data indicating that the second data is linked to the first data, and
      fifth data indicating that the third data is linked to the first data;
   processing at least the first text using a first trained model associated with the first data, wherein the first trained model is configured to generate a first score representing a likelihood that the first text corresponds to the first category of commands;
   processing at least the first text using a second trained model associated with the second data, wherein the second trained model is configured to generate a second score representing a likelihood that the first text corresponds to the first command;
   processing at least the first text using a third trained model associated with the third data, wherein the third trained model is configured to generate a third score representing a likelihood that the first text corresponds to the second command;
   determining that the second score is higher than the first score and the third score;
   accessing at least one second stored data structure representing a hierarchical arrangement of entity types, the at least one second stored data structure including:
      sixth data corresponding to first category entity types,
      seventh data corresponding to a first entity type within the first category of entity types, and
      eighth data indicating that the seventh data is linked to the sixth data;
   processing at least the second text using a fourth trained model associated with the sixth data, wherein the fourth trained model is configured to generate a fourth score representing a likelihood that the second text corresponds to the first category of entity types;
   processing at least the second text using a fifth trained model associated with the seventh data, wherein the fifth trained model is configured to generate a fifth score representing a likelihood that the second text corresponds to the first entity type;
   determining that the fifth score is higher than the fourth score;
   identifying, using the first entity type and the knowledge base, a specific entity corresponding to the second text; and
   causing the first command to be executed with respect to the specific entity.

2. The computer-implemented method of claim 1, wherein the at least one first stored data structure further includes ninth data corresponding to a second category of commands, and tenth data indicating that the ninth data is linked to data in the at least one first stored data structure other than the first, second, and third data, and the method further comprises:
   processing at least the first text using a sixth trained model associated with the ninth data wherein the sixth trained model is configured to generate a sixth score representing a likelihood that the first text corresponds to the second category of commands; and
   prior to determining the second score:
      determining the first score is over a threshold, and
      determining the sixth score is below the first score.

3. A computer-implemented method, comprising:
   receiving query text corresponding to a natural language query;
   processing the query text to determine that first text in the query text corresponds to a first command and that second text in the query text corresponds to an entity with respect to which the first command is to be executed;
   accessing at least one first stored data structure representing a hierarchical arrangement of entity types, the at least one first stored data structure including:
      first data corresponding to a first category of entity types,
      second data corresponding to a first entity type within the first category of entity types,
      third data corresponding to a second entity type that is not within the first category of entity types, fourth data indicating that the second data is linked to the first data, and fifth data indicating that the third data is linked to data in the at least one first stored data structure other than the first data;

processing at least the second text with a first trained model associated with the first data, wherein the first trained model is configured to generate a first score representing a likelihood that the second text corresponds to the first category of entity types;

processing at least the second text with a second trained model associated with the second data, wherein the second trained model is configured to determine a second score representing a likelihood that the second text corresponds to the first entity type;

processing at least the second text with a third trained model associated with the third data, wherein the third trained model is configured to determine a third score representing a likelihood that the second text corresponds to the second entity type;

identifying, using the first score, the second score and the third score, a particular entity type or category of entity types within the hierarchical arrangement of entity types that corresponds to the second text;

identifying, using the particular entity type or category of entity types and a knowledge base, a specific entity that corresponds to the second text; and causing the first command to be executed with respect to the specific entity.

4. The computer-implemented method of claim 3, wherein the determining that the first text corresponds to the first command further comprises:

accessing at least one second stored data structure representing a hierarchical arrangement of commands, the at least one second stored data structure including:

sixth data corresponding to a first category commands, seventh data corresponding to a first command within the first category of commands, eighth data corresponding to a second command that is not within the first category of commands, ninth data indicating that the seventh data is linked to the sixth data, and tenth data indicating that the eighth data is linked to data in the at least one second stored data structure other than the sixth data;

processing at least the first text with a fourth trained model associated with the sixth data, wherein the fourth trained model is configured to determine a fourth score representing a likelihood that the first text corresponds to the first category of commands;

processing at least the first text with a fifth trained model associated with the seventh data, wherein the fifth trained model is configured to determine a fifth score representing a likelihood that the first text corresponds to the first command;

processing at least the first text with a sixth trained model associated with the eighth data, wherein the sixth trained model is configured to determine a sixth score representing a likelihood that the first text corresponds to the second command; and determining, using the fourth score, the fifth score and the sixth score, that the first text corresponds to the first command.

5. The computer-implemented method of claim 4, wherein the processing the at least the first text with the fourth trained model occurs prior to the processing the at least the first text with the fifth trained model or the sixth trained model.

6. The computer-implemented method of claim 4, wherein:

the at least one second stored data structure further includes:

eleventh data corresponding to a second category of commands that does not overlap with the first category of commands, and twelfth data indicating that the eighth data is linked to the eleventh data; and the determining that the first text corresponds to the first command further comprises:

processing at least the first text with a seventh trained model associated with the eleventh data wherein the seventh trained model is configured to determine a seventh score representing a likelihood that the first text corresponds to the second category of commands, and further using the seventh score to determine that the first text corresponds to the first command.

7. The computer-implemented method of claim 4, wherein the determining that the first text corresponds to the first command further comprises determining that the fifth score is higher than the sixth score.

8. The computer-implemented method of claim 3, further comprising:

receiving audio data; and performing speech recognition processing to determine the query text.

9. The computer-implemented method of claim 3, wherein the processing the at least the second text with the first trained model occurs prior to the processing the at least the second text with the second trained model or the third trained model.

10. The computer-implemented method of claim 3, wherein:

the at least one first stored data structure further includes:

sixth data corresponding to a second category of entity types that does not overlap with the first category of entity types, and seventh data indicating that the third data is linked to the sixth data;

the method further comprises:

processing at least the second text with a fourth trained model associated with the sixth data, wherein the fourth trained model is configured to determine a fourth score representing a likelihood that the second text corresponds to the second category of entity types; and the identifying the particular entity type or category of entity types further uses the fourth score to identify the particular entity type or category of entity types.

11. The computer-implemented method of claim 3, wherein the identifying the particular entity type or category of entity types further comprises determining that the second score is higher than the third score.

12. A system, comprising:

at least one processor;

at least one first computer-readable medium including at least one first stored data structure representing a hierarchical arrangement of entity types, the at least one first stored data structure including:

first data corresponding to a first category of entity types, second data corresponding to a first entity type within the first category of entity types, third data corresponding to a second entity type that is not within the first category of entity types, fourth data indicating that the second data is linked to the first data, and fifth data indicating that the third data is linked to data in the at least one first stored data structure other than the first data; and at least one second computer-readable medium encoded with instructions which, when executed by the at least one processor, cause the system to system to:

receive query text corresponding to a natural language query;

process the query text to determine that first text in the query text corresponds to a first command and that second text in the query text corresponds to an entity with respect to which the first command is to be executed;

process at least the second text with a first trained model associated with the first data, wherein the first trained model is configured to determine a first score representing a likelihood that the second text corresponds to the first category of entity types;

process at least the second text with a second trained model associated with the second data, wherein the second trained model is configured to determine a second score representing a likelihood that the second text corresponds to the first entity type;

process at least the second text with a third trained model associated with the third data, wherein the third trained model is configured to determine a third score representing a likelihood that the second text corresponds to the second entity type;

identify, using the first score, the second score and the third score, a particular entity type or category of entity types within the hierarchical arrangement of entity types that corresponds to the second text;

identify, using the particular entity type or category of entity types and a knowledgebase, a specific entity that corresponds to the second text; and cause the first command to be executed with respect to the specific entity.

13. The system of claim 12, wherein:

the at least one first computer-readable medium further includes at least one second stored data structure representing a hierarchical arrangement of commands, the at least one second stored data structure including:

sixth data corresponding to a first category commands, seventh data corresponding to a first command within the first category of commands, eighth data corresponding to a second command that is not within the first category of commands, ninth data indicating that the seventh data is linked to the sixth data, and tenth data indicating that the eighth data is linked to data in the at least one second stored data structure other than the sixth data; and the instructions that cause the system to determine that the first text corresponds to the first command comprise additional instructions that, when executed by the at least one processor, further cause the system to:

process at least the first text with a fourth trained model associated with the sixth data, wherein the fourth trained model is configured to determine a fourth score representing a likelihood that the first text corresponds to the first category of commands, process at least the first text with a fifth trained model associated with the seventh data, wherein the fifth trained model is configured to determine a fifth score representing a likelihood that the first text corresponds to the first command, process at least the first text with a sixth trained model associated with the eighth data, wherein the sixth trained model is configured to determine a sixth score representing a likelihood that the first text corresponds to the second command, and determine, using the fourth score, the fifth score and the sixth score, that the first text corresponds to the first command.

14. The system of claim 13, wherein the at least one second computer-readable medium is encoded with additional instructions which, when executed by the at least one processor, further cause the system to process the at least the first text with the fourth trained model prior to processing the at least the first text with the fifth trained model or the sixth trained model.

15. The system of claim 13, wherein:

the at least one second stored data structure further includes:

eleventh data corresponding to a second category of commands that does not overlap with the first category of commands, and twelfth data indicating that the eighth data is linked to the eleventh data; and the instructions that cause the system to determine that the first text corresponds to the first command comprise additional instructions that, when executed by the at least one processor, further cause the system to:

process the at least the first text with a seventh trained model associated with the twelfth data, wherein the seventh trained model is configured to determine a seventh score representing a likelihood that the first text corresponds to the second category of commands, and further use the seventh score to determine that the first text corresponds to the first command.

16. The system of claim 13, wherein the instructions that cause the system to determine that the first text corresponds to the first command comprise additional instructions that, when executed by the at least one processor, further cause the system to determine that the fifth score is higher than the sixth score.

17. The system of claim 12, wherein the at least one second computer-readable medium is encoded with additional instructions which, when executed by the at least one processor, further cause the system to:

receive audio data; and perform speech recognition processing to determine the query text.

18. The system of claim 12, wherein the at least one second computer-readable medium is encoded with additional instructions which, when executed by the at least one processor, further cause the system to:

process the at least the second text with the first trained model prior to processing the at least the second text with the second trained model or the third trained model.

19. The system of claim 12, wherein:

the at least one first stored data structure further includes:

sixth data corresponding to a second category of entity types that does not overlap with the first category of entity types, and seventh data indicating that the third data is linked to the sixth data;

the at least one second computer-readable medium is encoded with additional instructions which, when executed by the at least one processor, further cause the system to process the at least the second text with a fourth trained model associated with the sixth data, wherein the fourth trained model is configured to determine a fourth score representing a likelihood that the second text corresponds to the second category of entity types; and the instructions that cause the system to identify the particular entity type or category of entity types comprise additional instructions that, when executed by the at least one processor, further cause the system to further use the fourth score to identify the particular entity type or category of entity types.

20. The system of claim 12, wherein the instructions that cause the system to identify the particular entity type or category of entity types further comprise additional instructions that, when executed by the at least one processor, further cause the system to determine that the second score is higher than the third score.

\* \* \* \* \*